Nov. 1, 1927.

I. LEVINSON

RESILIENT TIRE

Filed Oct. 26, 1926

Inventor
Israel Levinson

By Clarence A. O'Brien
Attorney

Nov. 1, 1927.

I. LEVINSON 1,647,455

RESILIENT TIRE

Filed Oct. 26, 1926

Inventor
Israel Levinson

By *Clarence A O'Brien*

Attorney

Patented Nov. 1, 1927.

1,647,455

UNITED STATES PATENT OFFICE.

ISRAEL LEVINSON, OF CLEVELAND, OHIO.

RESILIENT TIRE.

Application filed October 26, 1926. Serial No. 144,289.

This invention relates to an improved resilient tire and it has more particular reference to a structure of this class embodying an ordinary tire casing and an improved resilient core constructed to function as a substitute for the ordinary pneumatic inner tube.

Briefly, the invention has reference to a resilient core of this nature which is composed of a multiplicity of special spring units arranged in abutting relation through the circumference of the casing.

The particular structural features characterizing and lending individuality to the present invention, will become apparent from the following description and drawings.

In the accompanying drawings:—

Figure 1:
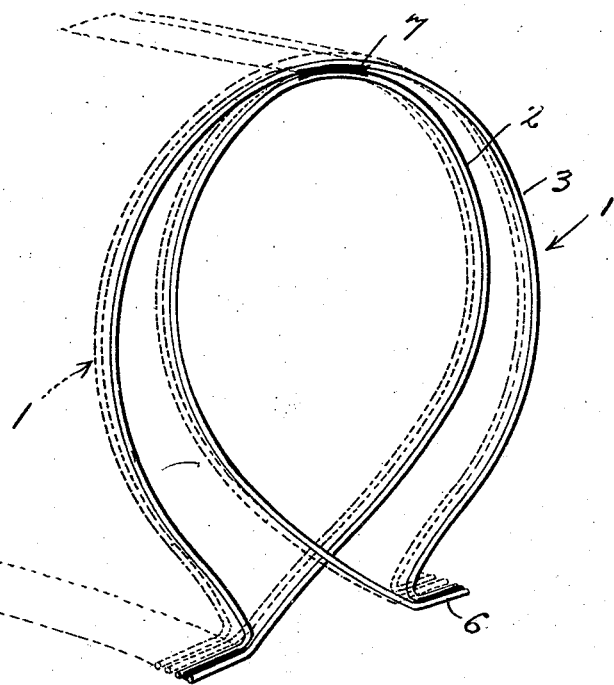
Figure 1 is a perspective view showing the approximate association of two of the spring units, one being in full lines and one being in dotted lines.
Figure 2:
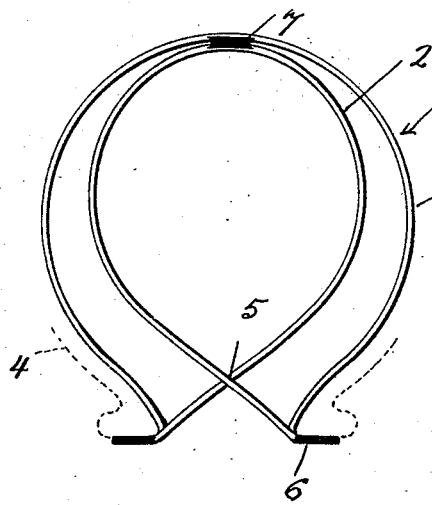
Fig. 2 is an end elevation of one of the units, showing the respective elements thereof expanded.
Figure 3:
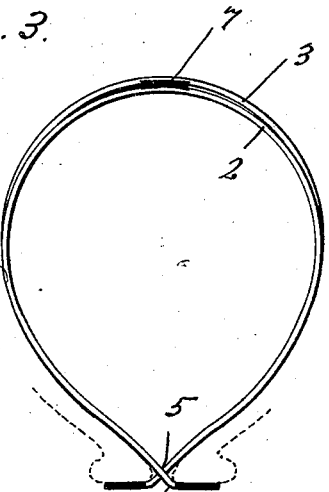
Fig. 3 is a view like Fig. 2, showing the elements contracted.

Attention is first confined to Figs. 1 to 3 inclusive wherein it will be seen that each unit is designated generally by the reference character 1. As indicated, the same is composed of two elements, each in the form of a comparatively small spring wire of cylindrical cross section. There is an inner spring 2 and an outer spring 3. These are of a shape to correspond to the interior of the prior casing 4. The end portions of the springs 2 are arranged in intersecting or crossed relation as indicated at 5. The extremities of both springs are directed laterally and welded together as at 6, in order to cooperate with the beads of the casing.

Moreover, the crest portions of the springs are soldered or welded or otherwise connected as indicated at 7. As before stated, the several spring units are arranged in somewhat abutting relation as represented in Fig. 1, throughout the entire circumference of the tire casing. When expanded the springs assume the position shown in Fig. 2, and when contracted they assume the position shown in Fig. 3.

Figure 4:
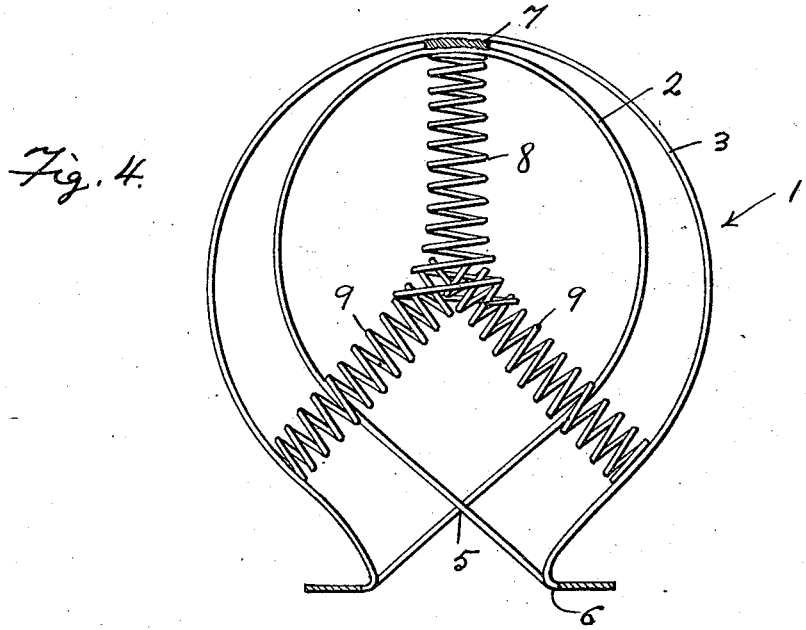
Fig. 4 is an end or side elevation of a different embodiment of the invention.

The form of spring construction just described is adapted for use in comparatively light-weight casings, for the smaller types of cars. The form represented in Fig. 4 is for heavier cars. This form is identical with that already described with the exception of additional resilient reinforcing means consisting of a central coiled spring 8 and a pair of outwardly diverging coiled springs 9. The spring 8 is connected to the welded joint 7 and the outer ends of the springs 9 are suitably connected to the opposite end portions of the spring 3.

Figure 5:
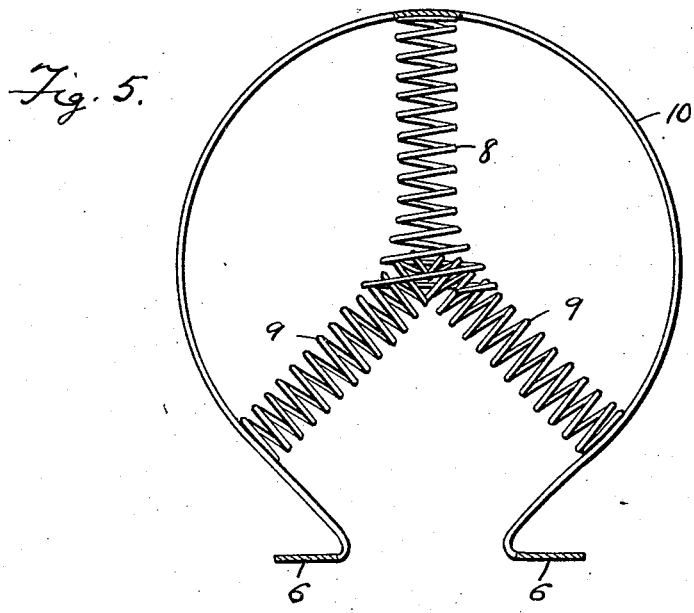
Fig. 5 is a view of a still further embodiment.

Otherwise the structure is the same as that already described. In Fig. 5, I represent a single screen wire 10 of the same shape and embodying the coiled springs 8 and 9. In other words in this form of the invention, the inner spring 2 is eliminated.

From the foregoing description it will be seen that I have evolved and produced a novel inner tube substitute in the form of a resilient core composed of a multiplicity of spring units constructed for arrangement in the casing to maintain the same in an even, taut, and fully expanded condition. The arrangement is such as to withstand the uneven pressures to which it is subjected in use, while maintaining uniformity of resilient pressure upon the casing at all times, whereby to insure easy riding, and to obviate undue wear upon the laminated casing structures.

It is believed that by carefully considering the description in connection with the drawings, a clear understanding of the construction and use of the invention will be had. Therefore, a more lengthy description is thought unnecessary.

While the preferred embodiment of the invention has been shown and described, it is to be understood that minor changes coming within the field of invention claimed, may be resorted to if desired.

Having thus described my invention, what I claim as new is:—

1. As a new product of manufacture, a resilient unit adapted to operate as a portion of a core for disposition within the casing of an ordinary form of pneumatic tire, said unit comprising a spring bent to conform to the internal shape of the casing in which it is to be fitted, the ends of the same being spaced apart and terminating in outwardly directed extensions for cooperation with the beads of said casing, an inner spring having its crown portion attached to the corresponding portion of the first spring, and having its end portions disposed in crossed relation and connected with the end portions of the first spring.

2. As a new product of manufacture, a resilient unit adapted to operate as a portion of a core for disposition within the casing of an ordinary form of pneumatic tire, said unit comprising a spring bent to conform to the internal shape of the casing in which it is to be fitted, the ends of the same being spaced apart and terminating in outwardly directed extensions for cooperation with the beads of said casing, an inner spring having its crown portion attached to the corresponding portion of the first spring, and having its end portions disposed in crossed relation and connected with the end portions of the first spring, together with a plurality of supplemental coiled springs arranged within the area of the first-named springs, and connected to the latter.

In testimony whereof I affix my signature.

ISRAEL LEVINSON.